US005823220A

United States Patent [19]
McBrayer, Jr. et al.

[11] Patent Number: 5,823,220
[45] Date of Patent: Oct. 20, 1998

[54] PRESSURE REDUCTION SYSTEM AND METHOD

[75] Inventors: Roy N. McBrayer, Jr., Austin; Jimmy G. Swan, Alvin; John S. Barber, Round Rock, all of Tex.

[73] Assignee: RPC Waste Management Services, Inc., Austin, Tex.

[21] Appl. No.: 659,265

[22] Filed: Jun. 6, 1996

Related U.S. Application Data

[62] Division of Ser. No. 283,699, Aug. 1, 1994, Pat. No. 5,551,472.

[51] Int. Cl.$^6$ .................................................... G05D 11/00
[52] U.S. Cl. ............................ 137/13; 137/114; 137/340; 417/32; 417/43
[58] Field of Search .................................. 137/114, 334, 137/340, 13; 417/32, 43

[56] References Cited

U.S. PATENT DOCUMENTS

| | | |
|---|---|---|
| 1,725,782 | 8/1929 | Florez . |
| 1,986,196 | 1/1935 | Grosse . |
| 2,398,546 | 4/1946 | Messmore . |
| 2,476,598 | 7/1949 | Hall . |
| 2,519,616 | 8/1950 | Watkins . |
| 2,545,384 | 3/1951 | Rehrig . |
| 2,647,368 | 8/1953 | Triebbnigg et al. . |
| 2,665,249 | 1/1954 | Zimmermann . |
| 2,692,800 | 10/1954 | Nichols et al. . |
| 2,697,910 | 12/1954 | Brzozowski . |
| 2,735,265 | 2/1956 | du Bois Eastman . |
| 2,767,233 | 10/1956 | Mullen, II et al. . |
| 2,824,058 | 2/1958 | Zimmermann . |
| 2,944,396 | 7/1960 | Barton et al. . |
| 3,047,003 | 7/1962 | Gurney . |
| 3,047,371 | 7/1962 | Krause et al. . |
| 3,101,592 | 8/1963 | Robertson et al. . |
| 3,129,587 | 4/1964 | Hallanger . |

(List continued on next page.)

FOREIGN PATENT DOCUMENTS

| | | |
|---|---|---|
| 2074947 | 1/1991 | Canada . |
| 0 073 355 A1 | 8/1982 | European Pat. Off. . |
| 0 085 961 | 8/1983 | European Pat. Off. . |
| 0 135 144 | 3/1985 | European Pat. Off. . |
| 0 388 915 | 9/1990 | European Pat. Off. . |
| 0 480 492 A1 | 4/1992 | European Pat. Off. . |
| 0 595 858 B1 | 4/1995 | European Pat. Off. . |
| 2 410 504 | 6/1979 | France . |
| 40 03 377 C1 | 8/1991 | Germany . |
| 1-38532 | of 0000 | Japan . |
| 62-68414 | of 0000 | Japan . |
| 53-091093 | 8/1978 | Japan . |
| 57-4225 | 1/1982 | Japan . |
| 483881 | 7/1971 | Russian Federation . |
| 521233 | 9/1976 | Russian Federation . |
| 576683 | 1/1980 | Russian Federation . |

(List continued on next page.)

OTHER PUBLICATIONS

Chowdhury et al., "Catalytic Wet Oxidation of Strong Waste Waters," AIChE Symp. 151:71 (1975), pp. 46–58.

Freeman, "Innovative Thermal Hazardous Organic Waste Treatment Processes," Noyes Publications: Park Ridge, New Jersey (1985), pp. 12–33.

Gloyna, "Supercritical Water Oxidation—Deep Well Technology for Toxic Wastewaters and Sludes," Technical Report, The University of Texas at Austin, 1989.

Imamura et al., "Wet Oxidation of Acetic Acid Catalyzed by Co–Bi Complex Oxides," Ind. Eng. Chem. Prod. Res. Dev., 21(4), pp. 570–575 (1982).

(List continued on next page.)

*Primary Examiner*—A. Michael Chambers
*Attorney, Agent, or Firm*—Conley, Rose & Tayon, PC

[57] ABSTRACT

Systems and methods for pressure reduction, including a first conduit with a pressure sensor, a static restriction device, and second conduit connected therebetween. Fluid is introduced through the second conduit as a function of the pressure sensed by the pressure sensor, thereby compensating for fluctuations in sensed pressures due to restriction device degradation and other factors.

31 Claims, 4 Drawing Sheets

U.S. PATENT DOCUMENTS

| | | |
|---|---|---|
| 3,149,176 | 9/1964 | Glazier et al. . |
| 3,207,572 | 9/1965 | Saul . |
| 3,282,459 | 11/1966 | Wilson . |
| 3,414,004 | 12/1968 | Bankston . |
| 3,431,075 | 3/1969 | Gunnell . |
| 3,449,247 | 6/1969 | Bauer . |
| 3,464,885 | 9/1969 | Land et al. . |
| 3,472,632 | 10/1969 | Hervert et al. . |
| 3,490,869 | 1/1970 | Heller . |
| 3,515,520 | 6/1970 | Hervert . |
| 3,549,314 | 12/1970 | Shah . |
| 3,606,999 | 9/1971 | Lawless . |
| 3,626,874 | 12/1971 | Grant . |
| 3,654,070 | 4/1972 | Pradt et al. . |
| 3,674,045 | 7/1972 | Millman et al. . |
| 3,682,142 | 8/1972 | Newkirk . |
| 3,716,474 | 2/1973 | Hess et al. . |
| 3,743,606 | 7/1973 | Marion et al. . |
| 3,761,409 | 9/1973 | McCoy et al. . |
| 3,804,756 | 4/1974 | Callahan et al. . |
| 3,849,075 | 11/1974 | Albright et al. . |
| 3,849,536 | 11/1974 | Morgan . |
| 3,852,192 | 12/1974 | Fassell et al. . |
| 3,853,759 | 12/1974 | Titmas . |
| 3,876,497 | 4/1975 | Hoffman . |
| 3,876,536 | 4/1975 | Pradt et al. . |
| 3,886,972 | 6/1975 | Scott et al. . |
| 3,899,923 | 8/1975 | Teller . |
| 3,900,300 | 8/1975 | Lehman . |
| 3,912,626 | 10/1975 | Ely et al. . |
| 3,920,506 | 11/1975 | Morgan . |
| 3,920,548 | 11/1975 | Fassell et al. . |
| 3,929,429 | 12/1975 | Crouch . |
| 3,938,972 | 2/1976 | Sugimura . |
| 3,945,805 | 3/1976 | Costello et al. . |
| 3,945,806 | 3/1976 | Costello et al. . |
| 3,971,872 | 7/1976 | LeBoeuf . |
| 3,977,966 | 8/1976 | Pradt et al. . |
| 3,978,661 | 9/1976 | Cheng . |
| 3,984,311 | 10/1976 | Diesen et al. . |
| 4,000,068 | 12/1976 | Nelson et al. . |
| 4,005,803 | 2/1977 | Kent . |
| 4,010,098 | 3/1977 | Fassell . |
| 4,013,560 | 3/1977 | Pradt . |
| 4,017,421 | 4/1977 | Othmer . |
| 4,061,566 | 12/1977 | Modell . |
| 4,100,730 | 7/1978 | Pradt . |
| 4,113,446 | 9/1978 | Modell et al. . |
| 4,124,528 | 11/1978 | Modell . |
| 4,141,829 | 2/1979 | Thiel et al. . |
| 4,145,283 | 3/1979 | Topp et al. . |
| 4,146,359 | 3/1979 | Lumpkin et al. . |
| 4,147,624 | 4/1979 | Modell . |
| 4,174,280 | 11/1979 | Pradt et al. . |
| 4,191,012 | 3/1980 | Stoddard et al. . |
| 4,199,545 | 4/1980 | Matovich . |
| 4,212,735 | 7/1980 | Miller . |
| 4,215,094 | 7/1980 | Inao et al. . |
| 4,217,218 | 8/1980 | Bauer . |
| 4,221,577 | 9/1980 | Lowrie . |
| 4,221,763 | 9/1980 | Greene . |
| 4,229,296 | 10/1980 | Wheaton et al. . |
| 4,241,722 | 12/1980 | Dickinson . |
| 4,272,383 | 6/1981 | McGrew . |
| 4,284,015 | 8/1981 | Dickinson . |
| 4,292,953 | 10/1981 | Dickinson . |
| 4,326,957 | 4/1982 | Rosenberg . |
| 4,338,199 | 7/1982 | Modell . |
| 4,344,785 | 8/1982 | Jensen . |
| 4,370,223 | 1/1983 | Bose . |
| 4,377,066 | 3/1983 | Dickinson . |
| 4,378,976 | 4/1983 | Rush . |
| 4,379,124 | 4/1983 | Fouquet . |
| 4,380,960 | 4/1983 | Dickinson . |
| 4,384,897 | 5/1983 | Brink . |
| 4,384,959 | 5/1983 | Bauer et al. . |
| 4,460,628 | 7/1984 | Wheaton et al. . |
| 4,485,003 | 11/1984 | Coenen et al. . |
| 4,488,866 | 12/1984 | Schirmer et al. . |
| 4,490,346 | 12/1984 | Cheng . |
| 4,510,958 | 4/1985 | Coursen . |
| 4,526,584 | 7/1985 | Funk . |
| 4,541,990 | 9/1985 | Mitterbacher . |
| 4,543,190 | 9/1985 | Modell . |
| 4,564,458 | 1/1986 | Burleson . |
| 4,593,202 | 6/1986 | Dickinson . |
| 4,594,164 | 6/1986 | Titmas . |
| 4,604,215 | 8/1986 | McCorquodale . |
| 4,643,890 | 2/1987 | Schramm . |
| 4,668,256 | 5/1987 | Billiet et al. . |
| 4,671,351 | 6/1987 | Rappe . |
| 4,683,122 | 7/1987 | Concordia et al. . |
| 4,692,252 | 9/1987 | Atwood et al. . |
| 4,698,157 | 10/1987 | Gillot . |
| 4,713,177 | 12/1987 | Atwood et al. . |
| 4,714,032 | 12/1987 | Dickinson . |
| 4,721,575 | 1/1988 | Binning et al. . |
| 4,733,852 | 3/1988 | Glasgow et al. . |
| 4,741,386 | 5/1988 | Rappe . |
| 4,744,908 | 5/1988 | Peterscheck et al. . |
| 4,744,909 | 5/1988 | Ferraro et al. . |
| 4,762,148 | 8/1988 | Marui et al. . |
| 4,765,900 | 8/1988 | Schwoyer et al. . |
| 4,767,543 | 8/1988 | Chornet et al. . |
| 4,774,006 | 9/1988 | Kaufmann . |
| 4,792,408 | 12/1988 | Titmas . |
| 4,793,153 | 12/1988 | Hembree et al. . |
| 4,801,090 | 1/1989 | Yoshida et al. . |
| 4,803,054 | 2/1989 | Sillerud et al. . |
| 4,822,394 | 4/1989 | Zeigler et al. . |
| 4,822,497 | 4/1989 | Hong et al. . |
| 4,853,136 | 8/1989 | Roussel et al. . |
| 4,853,205 | 8/1989 | Tolley et al. . |
| 4,861,484 | 8/1989 | Lichtin et al. . |
| 4,861,497 | 8/1989 | Welch . |
| 4,869,833 | 9/1989 | Binning et al. . |
| 4,872,890 | 10/1989 | Lamprecht et al. . |
| 4,880,440 | 11/1989 | Perrin . |
| 4,887,628 | 12/1989 | Bowe et al. . |
| 4,891,139 | 1/1990 | Zeigler et al. . |
| 4,898,107 | 2/1990 | Dickinson . |
| 4,928,885 | 5/1990 | Nakao . |
| 4,936,990 | 6/1990 | Brunsell et al. . |
| 4,962,275 | 10/1990 | Bruno . |
| 4,963,329 | 10/1990 | Burgess et al. . |
| 4,968,328 | 11/1990 | Duke . |
| 4,983,296 | 1/1991 | McMahon et al. . |
| 5,009,857 | 4/1991 | Hearle . |
| 5,011,614 | 4/1991 | Gresser et al. . |
| 5,052,426 | 10/1991 | Kasper . |
| 5,053,142 | 10/1991 | Sorensen et al. . |
| 5,057,220 | 10/1991 | Harada et al. . |
| 5,057,231 | 10/1991 | Mueller et al. . |
| 5,075,017 | 12/1991 | Hossain et al. . |
| 5,106,513 | 4/1992 | Hong . |
| 5,110,581 | 5/1992 | Derrah . |
| 5,133,877 | 7/1992 | Rofer et al. . |
| 5,167,930 | 12/1992 | Fassbender . |
| 5,183,577 | 2/1993 | Lehman . |
| 5,186,910 | 2/1993 | Alagy et al. . |
| 5,192,453 | 3/1993 | Keckler et al. . |
| 5,199,853 | 4/1993 | Padden . |

| | | |
|---|---|---|
| 5,207,399 | 5/1993 | Risberg et al. . |
| 5,221,486 | 6/1993 | Fassbender . |
| 5,230,810 | 7/1993 | Clark et al. . |
| 5,232,604 | 8/1993 | Swallow et al. . |
| 5,232,605 | 8/1993 | Baur et al. . |
| 5,238,671 | 8/1993 | Matson et al. . |
| 5,240,619 | 8/1993 | Copa et al. . |
| 5,250,193 | 10/1993 | Sawicki et al. . |
| 5,252,224 | 10/1993 | Modell et al. . |
| 5,252,297 | 10/1993 | Nakai . |
| 5,280,701 | 1/1994 | Tolman . |
| 5,326,540 | 7/1994 | Chastagner . |
| 5,339,621 | 8/1994 | Tolman . |
| 5,358,646 | 10/1994 | Gloyna et al. . |
| 5,370,799 | 12/1994 | Oddo et al. . |
| 5,384,051 | 1/1995 | McGinness . |
| 5,385,214 | 1/1995 | Spurgeon . |
| 5,387,398 | 2/1995 | Mueggenburg et al. . |
| 5,405,533 | 4/1995 | Hazlebeck et al. . |
| 5,417,937 | 5/1995 | Voigt et al. . |
| 5,417,953 | 5/1995 | Cappelli . |
| 5,421,998 | 6/1995 | Li et al. . |
| 5,425,883 | 6/1995 | Reid et al. . |
| 5,427,764 | 6/1995 | Barber . |
| 5,437,798 | 8/1995 | LaRoche et al. . |
| 5,454,950 | 10/1995 | Li et al. . |
| 5,492,634 | 2/1996 | Hong et al. . |
| 5,527,471 | 6/1996 | Hong et al. . |
| 5,536,385 | 7/1996 | Sheldon et al. . |
| 5,543,057 | 8/1996 | Whiting et al. . |
| 5,545,337 | 8/1996 | Hong . |
| 5,551,472 | 9/1996 | McBrayer Jr., et al. . |
| 5,558,783 | 9/1996 | McGuinness . |
| 5,560,823 | 10/1996 | Whiting . |
| 5,571,423 | 11/1996 | Daman . |
| 5,571,424 | 11/1996 | Ahluwalia . |

FOREIGN PATENT DOCUMENTS

| | | |
|---|---|---|
| 8200067 | 1/1992 | Sweden . |
| 584671 | 2/1947 | United Kingdom . |
| 2 075 484 | 11/1981 | United Kingdom . |
| 81/03169 | 5/1981 | WIPO . |
| 90/01367 | 2/1990 | WIPO . |
| 91/11394-A | 8/1991 | WIPO . |
| 92/18428 | 10/1992 | WIPO . |
| 92/21621 | 12/1992 | WIPO . |
| 92/21622 | 12/1992 | WIPO . |
| 93/00304 | 1/1993 | WIPO . |
| 93/00304-A | 1/1993 | WIPO . |
| 93/02969 | 2/1993 | WIPO . |
| 94/11310 | 5/1994 | WIPO . |
| 95/33693 | 12/1995 | WIPO . |

OTHER PUBLICATIONS

Lee et al., "Efficiency of Hydrogem Peroxide and Oxygen in Supercritical Water Oxidation of 2,4–Dichlorophenol and Acetic Acid," The Journal of Supercritical Fluids, 3 pp. 249–255 (1990).

Lu et al., "Selective Particle Deposition in Crossflow Filtration," Sep. Sci. and Technol., 24(7&8), 517–540 (1989).

Mahlman et al., "Cross–Flow Filtration in Physical Chemical Treatment of Municipal Sewage Effluents," Oak Ridge Natl. Lab. Technical Report, EPA/600/2–76/025, Feb. 1976.

Modell et al., "Supercritical Water—Testing Reveals New Process Holds Promise," Solid Wastes Management, Aug. 1982.

Murkes, "Low–shear and High–shear Cross–flow Filtration," Filtration and Separation, 23(6), 364–365 (1986).

Murkes et al., Crossflow Filtration: Theory and Practice, John Wiley & Sons: New York, 1988.

Opatken, "Aqueous–Phase Oxidation of Sludge Using the Vertical Reaction Vessel System," EPA/600/2–87/022, Mar. 1987.

Perona et al., A Pilot Plant for Sewage Treatment by Cross–Flow Filtration,: Oak Ridge Natl. Lab. Technical Report ORNL–TM–4659, Oct. 1974.

Shapira et al., Removal of Heavy Metals and Suspended Solids from Battery Wastewaters: Application of Hydroperm Cross–flow Microfiltration,: Gen. Battery Corp. Report EPA/600/2–81–147, Aug. 1981.

Thomason et al., "Supercritical Water Destruction of Aqueous Wastes," Hazardous Waste, 1(4), 453–467 (1984).

Teletke, "Wet Air Oxidation," Chem. Eng. Prog., 60(1), pp. 33–38, Jan. 1964.

Yang et al., "Homogenous Catalysis in the Oxidation of p–Chlorophenol in Supercritical Water," Ind. Eng. Chem. Res., 27(1), pp. 2009–2014 (1988).

Zimmerman, "New Waste Disposal Process," Chem. Eng., pp. 117–120, Aug., 1985.

Jacobs et al., "Phase Segregation," Handbook of Separation Process Technology, published by John Wiley & Sons (1987).

Stone & Webster Engineering Corp., "Assessment and Development of an Industrial Wet Oxidation System for Burning Waste and Low Grade Fuels," Final Report, Work Performed Under Contract DE–FC07 881D12711, Prepared for U.S. Department of Energy, Sep., 1989.

Todheide et al., "Das Zweiphasengebiet und die kritische Kurve im System Kohlendioxid—Wasser bis zu Druken von 3500 bar," Zeitschrift fur Physikalischo Chemie Neue Folge, Bd. 37, 8. 387–401 (1963).

Keng–Chen Chang et al., "Supercritical water oxidation of acetic acid by potassium permanganate," J. of Hazardous Materials, vol. 32, pp. 001–012.

Yoshiaki Harada, "Wet Catalytic Oxidation Process for Wastewater Treatment," Abstract (1991).

Sellchiro Imamura et al., "Wet Oxidation of Ammonia Catalyzed by Cerium–Based Composite Oxides," Ind. Eng. Chem. Prod. Res. Dev., vol. 24, No. 1, pp. 75–80 (1985).

Lei Jin et al., "The Effect of Supercritical Water on the Catalytic Oxidation of 1–4–Dichlorobenzene," presented by AIChE Spring Meeting, Orlando, FL, Mar. 19–23 (1990), Abstract.

Dong–Soo Lee et al., "Efficiency of $H_2O_2$ in Supercritical Water Oxidation of 2,4–Dichlorophenol and Acetic Acid," presented at AIChE Spring Meeting, Orlando, FL, Mar. 18–22 (1990).

Teletzke et al., "Components of Sludge and Its Wet Air Oxidation Products," Journal WPCF, 39 (6): 994–1005, 1967.

Conditt and Sievers, "Microanalysis of Reaction Products in Sealed Tube Wet Air Oxidations by Capillary Gas Chromatography," Anal. Chem., 56:2620–2622, 1984.

McGinnis et al., "Conversion of Biomass into Chemicals with High–Temperature Wet Oxidation," Ind. Eng. Chem. Prod. Reg, Dev., 22(4):633–636, 1984.

Baker, et al., "Membrane Separation Systems—A Research & Development Needs Assessment," Department of Energy Membrane Separation Systems Research Needs Assessment Group, Final Report, II, Mar. 1990.

Urusova, Phase Equilibria in the Sodium Hydroxide–Water and Sodium Chloride–Water Systems at 350–550 deg., Russian Journal of Inorganic Chemistry, 19–(3):450–454, 1974.

Valyashko, "Phase Equilibria in Water–Salt Systems: Some Problems of Solubility at Elevated Temperature and Pressure," High Temperature High Pressure Electrochemistry in Aqueous Solutions. National Association of Corrosion Engineers, 4:153–157, 1976.

Armellini and Tester, "Salt Separation During Supercritical Water Oxidation of Human Metabolic Waste: Fundamental Studies of Salt Nucleation and Growth," Society of Automotive Engineers, Inc., pp. 189–203, 1990.

Dell–Orco et al., "The Solubility of 1:1 Nitrate Electrolytes in Supercritical Water," Los Alamos National Lab Reporter, LA–UR–92–3359, pp. 1–17, 1992.

Martynova, "Solubility of Inorganic Compounds in Subcritical and Supercritical Water," High Temperature High Pressure Electrochemistry in Aqueous Solutions. National Association of corrosion Engineers, 4:131–138, 1976.

Armellini and Tester, "Solubilities of Sodium Chloride and Sodium Sulfate in Sub– and Supercritical Water Vapor," AIChE National Meeting, Los Angeles, California, Nov. 17–22, 1991, pp. 1–15.

McBrayer et al., "Research and Development of a Commercial Supercritical Water Oxidation Process," Hazardous Material International 1993, Proceedings, 11$^{th}$ Annual Eng. Management and Technology Conference.

"Researchers Explore Applications for Supercritical Water Oxidation," The Hazardous Waste Consultant, Mar./Apr. 1994, pp. 1.11–1.15.

Collection of Information from presentations given to representatives of Texas in or about Dec. 1991 to Jan. 10, 1992, including "Case 1" flow diagram, a Reaction Injection System diagram, a Process Flow diagram, a Case 2 flow diagram, a diagram entitled TCA SCWO Unit Schedule dated Jan. 1992, a diagram entitled Phases of Water at Moderate Pressures, a diagram entitled Figure PD2 Properties of Water (3,200–4,400 psia), a diagram entitled Figure PD9 Basic Configuration of Supercritical Oxidation Unit, a diagram entitled UTPILOT Unit Coiled Reactor, a diagram plotting temperatures vs. Distance from reactor inlet, a chart and diagram entitled Texaco Waste Run 15 Dec. 1991.

Handwritten Notes relating to work done in or about May, 1993 (9 pages).

Handwritten Notes by Roy McBrayer dated Jul.–Dec. 1991 (5 pages).

Handwritten Notes relating to work done on or about Dec., 1991 (11 pages).

Handwritten Notes relating to work done on or about Jan., 1992 (14 pages).

Handwritten Notes by Jimmy Swan dated Aug. 7, 1991 and Aug. 27, 1991 (2 pages).

Handwritten Notes by James Eller dated Jul.–Nov., 1991 (5 pages).

Killilea et al., "The Fate of Nitrogen in Supercritical Water Oxidation" MODAR, Inc., Natick, Massachusetts 01760 USA.

Excerpt from Publication Showing Salt Mixture Properties (pp. 124, 780, 781, 814, 816).

A.G. Fassbender, Supercritical Water Oxidation Workshop, "The Dual Shell Pressure Balanced Vessel: A Reactor for Corrosive Applications," (11 pages).

Excerpts From Publication "Strategies for Sticky Salts," (2 pages).

Eco Waste Technologies, "Fact Sheet" and photograph of SCWO Pilot Plant, Aug. 1994 (2 pages).

Eco Waste Technologies, "Enviromental Breakthrough: Huntsman Announces Successful Use of New Technology," (2 pages).

Austin American–Statesman, Kirk Ladendorf, Article entitled "Company Hopes Treatment Cuts Waste," (1 page).

Eco Waste Technologies, Circular on Supercritical Water Oxidation (5 pages).

Jimmy Griffith, "Destruction of Aqueous Organic Wastes by Supercirtical Water Oxidation," Jun. 15–17, 1994, (12 pages).

Dr. Earnest F. Gloyna, P.E. "Supercritical Water Oxidation Applications For Industrial Sludes," Jan. 30, 1992, (pp. 1–15).

Earnest F. Gloyna and Lixiong Li, "Supercritical Water Oxidation: An Engineering Update," Feb. 1992, (pp. 1–25). Separations Research Program Center for Energy Studies, The University of Texas at Austin, "Separation Update," Spring 1994 issue, (pp. 1–4).

E.F. Gloyna, L. Li and R.N. McBrayer, "Engineering Aspects of Supercritical Water Oxidation," Wat. Sci. Tech., vol. 30, No. 9, 1994, (pp. 1–10).

Sheets, David Allan, B.S.Ch.E., Report entitled "Erosion Control in Supercritical Water Systems", University of Texas at Austin, May 1991, pp. i–ix and 1–72.

Tester, J.W., et al., "Supercritical Water Oxidation Technology: A Review of Process Development and Fundamental Research", 1991 ACS Symposium Series Paper on Emerging Technologies for Hazardous Waste Management, Oct. 1–3, 1991, Atlanta, Georgia, Chemical Engineering Department, Massachusetts Institute of Technology, Cambridge, Massachusettes, pp. 1–58.

Zimmermann, et al., "The Zimmermann Process and Its Applications in the Pulp and Paper Industry", Tappi, Aug. 1960, vol. 43, No. 8., pp. 710–715.

PCT International Search Report, International Application No. PCT/US92/06459.

PCT International Search Report, International Application No. PCT/US95/08799.

PCT International Search Report, International Application No. PCT/US95/09666.

Barner, et al., "Supercritical Water Oxidation: An Emerging Technology", Presented at ACHEMA 1991—International Meeting on Chemical Engineering and Biotechnology, Jun. 9, 1991, ABB Lummus Crest Inc., pp. 1–14, Figs. 1–8.

Takahashi et al., "Subcritical and Supercritical Water Oxidation of CELSS Model Wastes", Department of Civil Engineering, Nigata University, Japan, pp. 95–106.

Whitlock, David Ramer, "Organic Reations in Supercritical Water", Submitted in Partial Fulfillment of the Requirements for the Degrees of Bachelor of Schience and Master of Science at the Massachusetts Institute of Technology, May, 1978, pp. 1–77.

Supercritical Water Oxidation Information Package, Aug. 1994, Eco Waste Technologies, pp. 1–41.

Dialog Patent Search, Mar. 10, 1995, pp. 1–13.

Dialog Patent Search, Sep. 1, 1995, p. 1–10.

PCT International Search Report, International Application No. PCT/US95/04017.

Dialog Patent Search, Jul. 19, 1995, pp. 1–7.

Derwent Abstracts of US 5232604, WO 9300304, US 5252224, EP 595858, pp. 1–10.

Dialog Patent Search, Apr. 26, 1995, pp. 5–13.

Pennwell Publishing Co., "Supercritical Water Oxidation Unit Destroys Organic Wastes," Oil and Gas Journal, Oct. 1994.

Dialog Patent Search, Jul. 19, 1995, pp. 1–8.

McBrayer et al., "Operation of the First Supercritical Water Oxidation Industrial Waste Facility," EcoWaste Technologies, 1995, pp. 1–8.

Cheremisinoff et al., editors, Pollution Engineering Practice Handbook, Ann Arbor Science Publishers, Inc., 1975, pp. 732–735.

Excerpt from Master's Thesis entitled "Erosion Control in Supercritical Water Systems," by David Allen Sheets, May, 1991, pp. 40–50.

General College Chemistry, $5^{th}$ Edition, Keenan, Charles W. et al., pp. 179–180.

Derwent Abstract of WO9111394–A, pp. 1–2.

Dialog Patent Search, Mar. 9, 1995, pp. 1–4.

Derwent Abstract of WO9300304–A, pp. 1–2.

Bramlette et al., "Destruction of DOE/DP Surrogate Wastes with Supercritical Water Oxidation Technology", Sandia National Laboratories Report, Nov. 1990, pp. 1–35.

Derwent Abstract of EP 513186, 1995.

PRESSURE REDUCTION SYSTEM AND METHOD

This application is a divisional application of U.S. Ser. No. 08/283,699, filed Aug. 1, 1994, now U.S. Pat. No. 5,551,472, issued Sep. 3, 1996.

BACKGROUND OF THE INVENTION

1. Field of the Invention

This invention generally relates to pressure reduction systems and methods, particularly pressure reduction systems and methods utilizing static restriction devices such as orifices, venturi tubes, reduced diameter tubing or piping, and/or capillary tubes. Such systems and methods may be particularly useful to reduce relatively high stream pressures (e.g., greater than about 3200 p.s.i.g.) in aqueous supercritical waste oxidation reaction systems.

2. Description of the Related Art

Pressure reduction of fluid streams by at least about 500 psi has presented problems in the art. In particular, in supercritical water oxidation ("SCWO") systems, reactors typically operate at relatively high pressures (e.g., greater than about 3200 psig) and produce effluent streams which contain significant quantities (up to about 10 to 20%) of gas. The gas typically includes carbon dioxide and oxygen. When this relatively high pressure is reduced, the expansion of gas in the stream tends to create high velocities and/or severe cavitation in the pressure reduction system. As a result, erosion within the pressure reduction device tends to be significantly enhanced. In some circumstances, corrosion also tends to be enhanced.

In addition, many SCWO streams typically include inorganic solids which have not been oxidized. When the pressure of streams containing these solids is reduced, the solids tend to produce a highly erosive environment for components within the pressure reduction device.

The treatment of waste slurries and sludge such as municipal waste sludge or paper mill sludge by SCWO has been hampered as a result of the aforementioned erosion problems. Typically, SCWO units treating sludge or slurries must separate the solid inert material from the effluent prior to depressurization. Therefore, the separated solids must be removed by a batch system instead of a continuous system. Batch systems tend to be more expensive to operate than continuous systems.

Various systems and methods have been used to overcome relatively high pressure reduction erosion problems. In one such system, a throttling "control" valve is used. Throttling valves, however, tend to typically experience extremely high rates of wear on the throttling surfaces. These high rates of wear are due to the fact that the throttling surfaces tend to have a limited area available to absorb the kinetic energy produced by the pressure reduction.

Relatively high rates of wear are particularly problematic when throttling valves are used in systems with relatively low flow rates. In such systems, the annular region between the seat and trim (through which the fluid flows) tends to be very small. Thus, valve wear is experienced in a limited region, and is therefore accentuated.

Relatively high pressure reduction is problematic in systems with relatively low flow rates for other reasons. In particular, the relatively small flow passages in such systems tend to become clogged or plugged when even a relatively small amount of solid particles are present in the fluid stream. Whether eroded or plugged, in either case pressure reduction devices in relatively low flow systems tend to not provide their intended function. In addition, commercial pressure reduction valves designed for use with high pressure solids-containing slurries or sludge tend to be unavailable or unworkable at flow rates under about 5–7 gallons per minute ("gpm").

In some circumstances, the erosive effects of relatively large pressure reductions have been countered by making pressure reduction devices out of extremely hard substances such as tungsten, carbide, stellite, titanium nitride, or various ceramics. Even these hardened substances tend to experience unacceptably excessive and rapid wear under the high velocities caused by large pressure reductions. In addition, extremely hard materials tend to be brittle, thus making them unsafe and/or unreliable for normal service.

Throttling valves are by design nonstatic pressure reduction devices which vary their throughput as a function of a selected value such as pressure or flow rate. Because of the above-mentioned problems with such valves, practitioners in the art have attempted to reduce the amount of pressure reduction experienced by each valve in the system. Such attempts have resulted in multiple throttle valves being placed in series, with each valve experiencing a reduced amount of pressure reduction.

Multiple throttle valve systems, however, tend to be more expensive than single stage pressure letdown systems and tend to require numerous control loops. Moreover, to prevent the control loops from interacting, typically accumulators must be positioned between each valve. For significant pressure reduction systems there can be as many as two to ten valve systems in series, thereby greatly increasing the cost and complexity of the pressure reduction system.

In relatively low flow rate systems, multiple valve systems have the further drawback that the flow passages in each throttle valve will be reduced (as compared to single valve systems) since the total system pressure drop is distributed over all valves in the system. As a result, pressure control tends to be erratic since at least one of the valves may tend to plug if there are solids in the stream.

Another problem encountered in the art relates to the fact that density changes in typical SCWO systems are not necessarily proportional to pressure drop. These SCWO systems typically include significant proportions of carbon dioxide, and the pressure-density relationship for carbon dioxide differs significantly than that for ideal gases. It has been observed that significant density changes in the throttled effluent gases do not occur until pressure is reduced under about 800–1000 p.s.i.a. When pressure is reduced below about 800–1000 p.s.i.a., the stream velocity tends to increase dramatically due to a lowering of the effluent gas density. The bulk of the erosion tends to occur after the density decrease occurs. Proper placement and sizing of control valves to accommodate this density change tends to be difficult.

Practitioners have also attempted to use multiple port valves which contain several valve seats within a single valve body. Such multiple port valves, however, are difficult to use in lower flowrate systems (because of clogging problems), and tend to suffer from mechanical limitations at higher pressures.

Rather than use dynamic restriction devices to achieve pressure reductions, practitioners have also attempted to use static restriction devices such as orifice plates, reduced diameter pipes or capillary tubes, venturi tubes, or other static restriction pressure drop devices. These static restriction devices, however, only operate at one flow rate for a given pressure decrease, or, alternatively, at one pressure decrease for a given flow rate. Of course, these systems also experience wear due to erosion when significant high pressure drops are achieved. When such erosion occurs, the static pressure restriction device no longer provides the same pressure drop for a given flow rate. As a result, maintaining accurate pressure drop control within the system is difficult. And if pressure control is difficult, then control of other system parameters such as temperature, flowrate, reaction rate, etc. will also be difficult since these other system parameters tend to vary (at least indirectly) as a function of pressure. The problem of varying parameter control has thus hindered the use of static restriction devices for pressure reduction.

Static restriction devices also present problems in relatively low flow rate systems. In these systems, the size of the restriction in the orifice plate, reduced diameter pipe, capillary tube, or venturi tube has to be small. As a result, these small restrictions tend to be highly susceptible to plugging.

U.S. Pat. No. 3,674,045 relates to a vortex valve fluid oscillator.

U.S. Pat. No. 1,725,782 relates to a method and apparatus for flow control.

U.S. Pat. No. 3,129,587 relates to a flow sensing device.

U.S. Pat. No. 4,887,628 relates to a fluidic apparatus in which a vortex amplifier functions as a choke valve to control flow in a flow line from, for example, a gas or oil well.

All of the above patents are hereby incorporated by reference.

SUMMARY OF THE INVENTION

The invention generally relates to a pressure reduction system and method. The pressure reduction system may include a first conduit connected to contain fluid during use, the first conduit being adapted to contain fluid at a pressure of at least about 500 p.s.i.g. during use. This system may also include a pressure sensor connected to sense the pressure of the fluid in the first conduit during use, and a static restriction device adapted to reduce the pressure of fluid flowing through it by at least about 500 p.s.i. during use. The static restriction device is connected downstream of the pressure sensor. The system also includes a second conduit connected to introduce fluid into the first conduit upstream of the static restriction device and downstream of the pressure sensor. Finally, the system includes an automatic fluid introduction system adapted to vary the amount of fluid introduced from the second conduit as a function of the pressure sensed by the pressure sensor.

The static restriction device may include an edge connected to contact fluid during use. One advantage of the system is that the second conduit may be connected to introduce fluid such that at least a portion of the fluid introduced through the second conduit during use contacts the edge of the static restriction device without first mixing with the fluid flowing through the first conduit during use. At least a portion of the fluid introduced through the second conduit during use acts as a barrier to inhibit at least a portion of the fluid flowing in the first conduit from contacting the static restriction device during use.

The system may include a substantially centrally disposed portion to hold fluid flowing in the first conduit during use, and an annular portion substantially surrounding the centrally disposed portion to hold fluid flowing in the second conduit during use.

The system is particularly adapted to reduce pressure in streams that contain at least about 50, 500, or 5000 ppm of entrained solids during use. The pressure of slurry or sludge streams may also be reduced without substantial erosion of the static restriction device.

Typically the static restriction device is sized to provide a selected pressure reduction for a known fluid flowrate. This known fluid flowrate is greater than the flowrate of fluid in the first conduit during use. Variances in the pressure reduced by the static restriction device may be compensated by lowering or raising the flow of fluid through the second conduit. Thus preferably the conduits, etc. in the system are sized so that during normal operation at least some flow of fluid is flowing in the second conduit.

The system is also particularly adapted to reduce the pressure of a fluid flowing within the static restriction device which includes a mixture of gas and liquid. The pressures within these gas/liquid streams may be otherwise difficult to reduce due to expansion and contraction of the gas and liquid as it flows through the static restriction device.

A pump may be part of the automatic fluid introduction system. The pump may be coupled to a pressure sensor and controller such that the amount of fluid pumped by the pump varies as a function of the pressure sensed by the pressure sensor during use.

The system may be particularly adapted to reduce the pressure of relatively low flow rate streams that include entrained solids.

The method of the invention may include reducing the pressure of a fluid by at least 500 p.s.i.g. by passing the fluid through a static restriction device. The method may include:
  flowing a first fluid stream at a pressure of at least about 500 p.s.i.g.
  sensing the pressure of the first fluid stream;
  mixing a second fluid stream with the first fluid stream;
  reducing the pressure of the mixed fluid stream by at least about 500 p.s.i. by flowing the mixed fluid stream through a static restriction device;
  varying the flowrate of the second fluid stream as a function of the sensed pressure.

The method may be particularly adapted for harsher stream conditions such as wherein the first fluid stream is at least about the vicinity of supercritical conditions for water, or wherein the first fluid stream is at least about supercritical conditions for water. The stream may first be cooled before having its pressure reduced, thus tending to lower the eroding effect of the stream.

An advantage of the systems and methods of the invention is that the inflexibility of static restriction devices (as this inflexibility relates to control of system pressure, pressure drop, temperature, flowrates, reaction rates, etc.) may be overcome.

For instance, erosion of a static restriction device would normally result in less pressure drop through the device for a given flowrate. As a result, if other system parameters remained unchanged, the flowrate through the static restriction device would increase. If, for instance, a SCWO reactor was placed upstream of the static restriction device, then flow through the first conduit would increase, the residence time and temperature within the reactor would tend to decline, and other variables would have to be changed to overcome these declines.

With the systems and methods of the invention, however, erosion in the static restriction device may be compensated for by adjusting the flow through the second conduit. As a result, the flow of fluid from the reactor (i.e., the flow in the first conduit) would remain fairly constant, and declines in residence time and temperature within the reactor could be avoided. Costly downtime to change or repair the static restriction device could thus be avoided or delayed.

DETAILED DESCRIPTION

Figure 1:
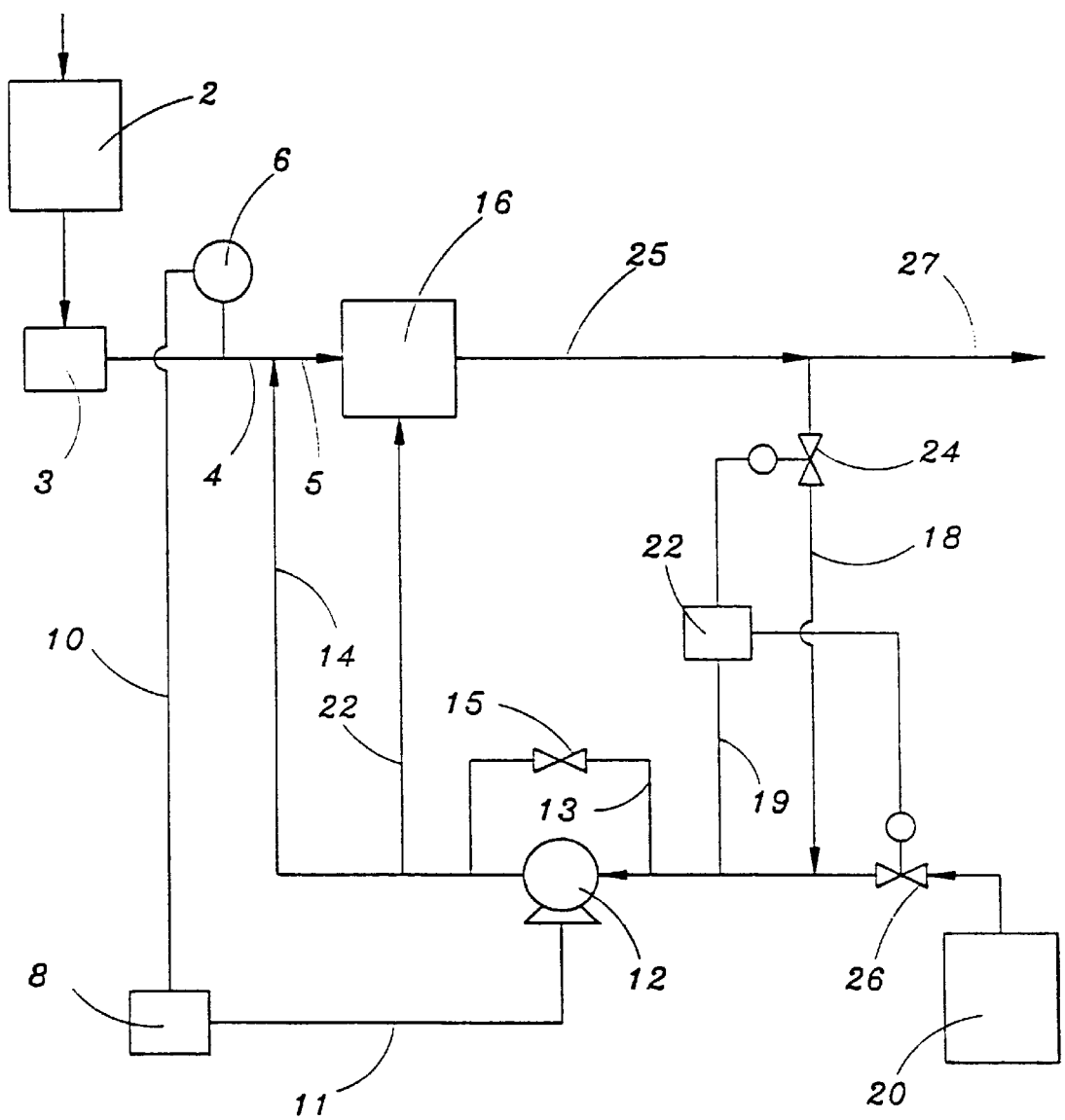
FIG. 1 depicts a schematic diagram of a pressure reduction system.

One embodiment of the invention includes a pressure reduction system with a first conduit connected to contain fluid during use. As shown in FIG. 1, the first conduit 4 may be adapted to contain fluid at a pressure of at least about 500 psig during use. A pressure sensor 6 may be connected to sense the pressure of the fluid stream in the first conduit 4. In addition, a static restriction device 16 may be connected downstream of the pressure sensor to receive fluid from conduit 5.

As shown in FIG. 1, a second conduit 14 may be connected to mix fluid with the fluid stream flowing in the first conduit 4. This mixture takes place upstream of the static restriction device 16 and downstream of the pressure sensor 6.

As used herein, the phrase "static restriction device" includes capillary tubes, orifices, venturi tubes, reduced diameter pipes, and other nonmoving components known in the art that are used to produce pressure reduction.

As shown in FIG. 1, pressure sensor 6 is connected via line 10 to a controller 8. Controller 8 may be a computer, a programmable logic controller, and other known controller systems known in the art. Controller 8 may be a PI or PID (proportional-integral or proportional-integral-derivative) controller. The controller may be part of an electronic, digital, or pneumatic system. In any case, controller 8 also sends, and optionally receives, signals to/from pump 12 via line 11. Lines 10 and 11 may be electronic, digital, or pneumatic.

Together lines 10, 11, and controller 8 are part of an automatic fluid introduction system which is adapted to vary the amount of fluids introduced from the second conduit 14 (and/or second conduit 22) as a function of the pressure sensed by the pressure sensor 6. Preferably as the pressure sensed by pressure sensor 6 decreases below a set value, then controller 8 will direct pump 12 to increase the flow of fluid within second conduit 14 and/or 22. For instance, controller 8 may direct pump 12 to increase its pumping speed and/or stroke length. The increased flow of fluid through conduit 14 and/or 22 would then mix with the flow of fluid through first conduit 4. As a result, a pressure increase would result and sensor 6 would then sense a higher pressure. This control feedback loop thereby provides a way to compensate for variations in the pressures within conduit 4.

Alternate ways are possible to vary the amount of fluid introduced from the second conduit 14 and/or 22. For instance, pump 12 may include a bypass 13 with a valve 15. The controller 8 may direct the valve 15 to be opened or closed, thereby varying the amount of fluid flowing in second conduit 14 and/or 22.

Fluid may be introduced before the static restriction device 16 via conduit 14 or via conduit 22 (see discussion regarding FIG. 2 below).

In a preferred embodiment the afore-mentioned system may be combined with a reactor 2 adapted to contain fluid at least about the vicinity of supercritical conditions for water (that is, at least about 500 deg. F. and 2000 psig) In this embodiment, fluid in first conduit 4 contains fluid flowing downstream of the reactor 2. Alternatively, the reactor may be adapted to contain fluid that is at least about supercritical conditions for water, that is at least about 700 deg. F. and at least about 3200 psig. The fluid flowing through first conduit 4 may include fluid at supercritical conditions for water, or in the vicinity of supercritical conditions for water.

In a preferred embodiment, the system may include a cooler 3 which is adapted to cool the fluid flowing through the first conduit 4. Cooler 3 may be a shell and tube heat exchanger, a fin-fan heat exchanger, or any other heat exchanger known in the art. Preferably, cooler 3 is placed downstream of reactor 2, thereby allowing cooler 3 to cool the fluid emerging from reactor 2. If the fluid emerging from reactor 2 is at least about supercritical conditions for water, cooler 3 may cool the fluid to the point that phase separation occurs, thus allowing separation of gas from liquid components in such fluid. A gas/liquid separator may be included in conjunction with cooler 3, or downstream of cooler 3.

As shown in FIG. 1, the fluid flowing to conduit 14 and/or 22 may include recycled fluid flowing through conduit 18. This recycled fluid flows from the static restriction device 16. Alternatively, fluid flowing through conduit 14 and/or 22 may come from a source 20. In the preferred embodiment, the source supplies water at or about ambient temperature. This water, when mixed with the fluid flowing through conduit 4, cools the mixed fluid. As a result, the temperature of the mixed fluid flowing through the static restriction device 16 is lowered, thus tending to reduce the corrosive and erosive effects on the static restriction device 16.

In the preferred embodiment, the amount of fluid recycled via conduit 18 may be controlled based on the temperature in conduit 19. In other words, a temperature in conduit 19 may be selected, and the proportion of fluid flowing from source 20 versus the amount of fluid flowing through recycle conduit 18 may be adjusted to achieve a mixture of fluid that is at the selected temperature. As shown in FIG. 1, to control the temperature of the fluid in conduit 19, a temperature sensor 22 may be provided in conjunction with control valves 24 and 26. A controller (also shown as 22) may then adjust the proportion of fluid flowing through valves 24 and/or 26 to achieve the desired or selected temperature of mixed fluid flowing through conduit 19. Alternately, a heater (or heat exchanger) may be placed in conduit 14 after pump 12. In this embodiment, the heater heats the fluid flowing in conduit 14 to a selected temperature prior to injection of the fluid into conduit 4.

In some embodiments, source 20 may provide fluid at least about supercritical conditions for water. It may be preferable to maintain the mixed fluid flowing in conduit 5 to static restriction device 16 at conditions that are in the vicinity of, or at least about, supercritical conditions for water. In such circumstances, the fluid flowing through second conduit 14 would preferably maintain or raise the temperature of the mixed fluid flowing through conduit 5 to static restriction device 16.

In FIG. 1, conduit 27 may allow fluid to flow to a discharge location or to a subsequent process.

Figure 2:
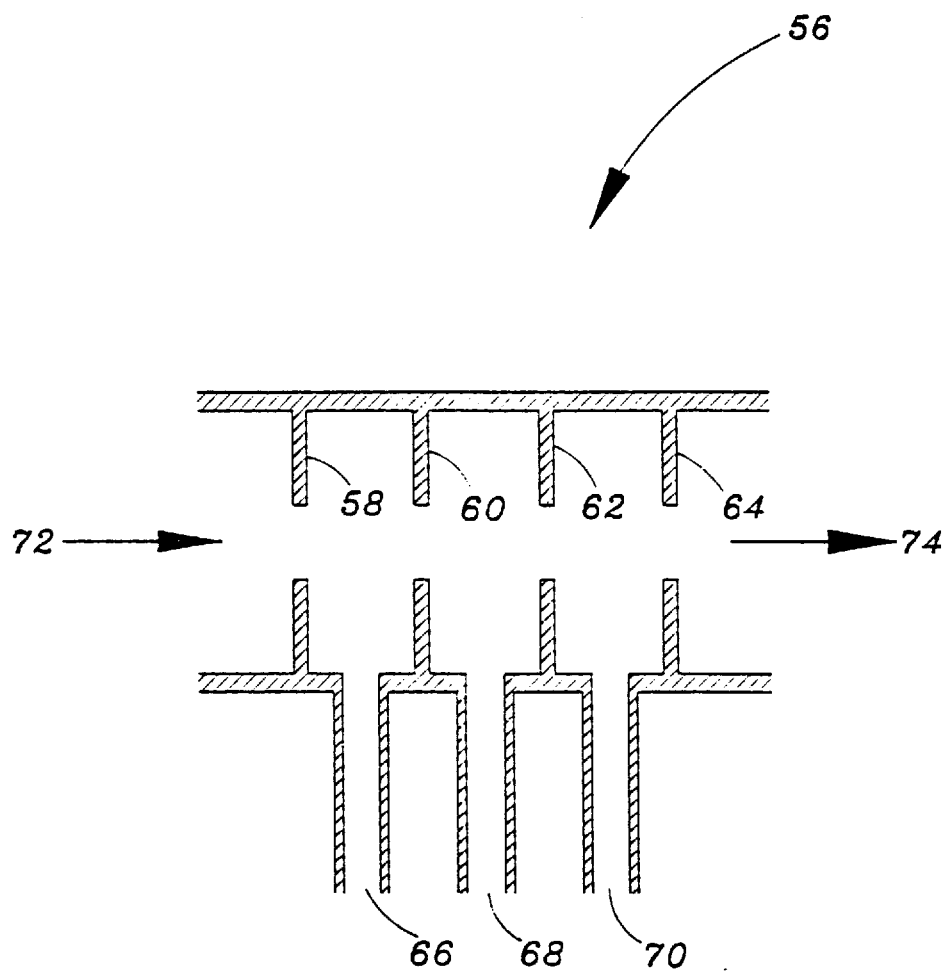
FIG. 2 depicts a pressure reduction system utilizing a plurality of pressure restrictions.

As shown in FIG. 2, the static restriction device may include a series of orifices such as 58, 60, 62, and 64. It is to be understood that any number of orifices may be provided, and that FIG. 2 illustrates four orifices for example purposes only. As shown in FIG. 2, fluid flowing in direction 72 would represent the fluid in conduit 5 of FIG. 1. Fluid flowing in direction 74 in FIG. 2 would represent the fluid flowing in conduit 25 of FIG. 1.

The static restriction device 56 in FIG. 2 may also include a plurality of conduits flowing thereto. For example purposes, three conduits 66, 68, and 70 are shown in FIG. 2. These conduits represent fluid flowing through conduit 22 in FIG. 1. Having a plurality of entry conduits 66, 68, and 70 may allow a more controlled flow profile, temperature profile, and/or pressure reduction profile within static restriction device 56. Thus, it is to be understood that the amount of fluid flowing through any one of conduits 66, 68, and 70 may be controlled to vary the amount of fluid flowing into the static restriction device 56.

Figure 3:
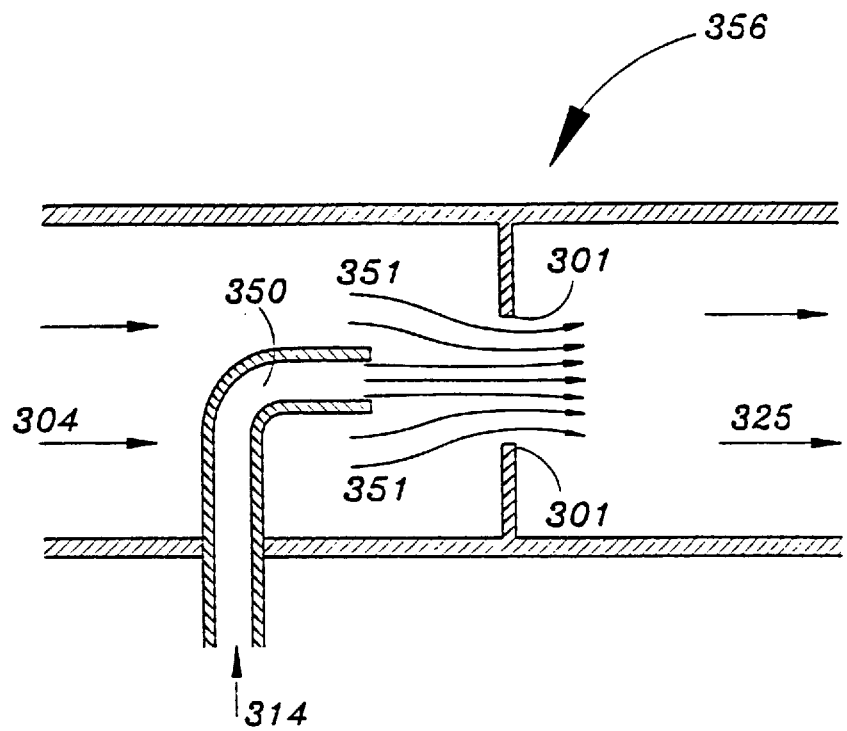
FIGS. 3 and 4 depict pressure reduction systems with a nozzle directing the flow of a fluid.

As shown in FIG. 3, the static restriction device 356 may include edges 301. Furthermore, in one preferred embodiment, fluid flowing through conduit 314 is directed via elbow 350 in a manner that provides the fluid in the approximate center of the orifice shown in FIG. 3. The fluid flowing through 314 may then mix with fluid flowing in conduit 304. The mixed fluid then flows through the pressure restriction device 356 into conduit 325.

It is to be understood that the fluid flowing through conduit 304 may correspond to either fluid flowing in conduit 4 or fluid flowing through conduit 14 in FIG. 1. Similarly, fluid flowing through conduit 314 in FIG. 3 may correspond to fluid flowing through conduit 4 or fluid flowing through conduit 14 in FIG. 1. If the fluid flowing through conduit 314 corresponds to the fluid flowing through conduit 4, then fluid flowing in streams 351 may represent the fluid flowing in conduit 14 of FIG. 1.

In a preferred embodiment, fluid flowing via conduit 304 may comprise relatively clean and/or low temperature fluids such as water. In such a case, the relatively clean and/or low temperature water may flow in streams 351 which tend to act as a barrier to inhibit at least a portion of the less clean and/or higher temperature fluid flowing through conduit 314 from contacting the static restriction device 356. As a result, erosion and/or corrosion of the static restriction device 356 may be reduced. This reduction in corrosion and/or erosion occurs because at least a portion of the fluid introduced through the second conduit (i.e., through conduit 304) contacts the edge 301 of the static restriction device 356 without first mixing with the fluid flowing through the first conduit (i.e., conduit 314).

Figure 4:
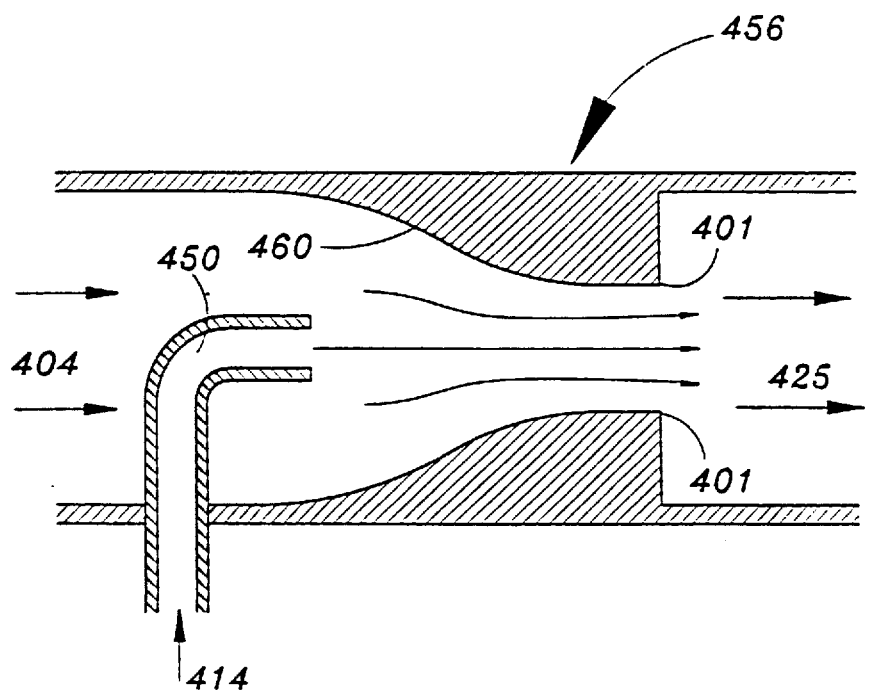

In FIG. 4, an alternative embodiment of FIG. 3 is shown. FIG. 4 depicts a static restriction device which includes a venturi 460 with inwardly sloping walls. In this embodiment, the pressure reduction is more gradual, which tends to reduce erosion and/or corrosion of the static restriction device 456. Reference numbers 401, 404, 414, 425, 450, and 456 correspond to the same components as reference numbers 301, 304, 314, 325, 350, and 356, respectively.

Figure 5:
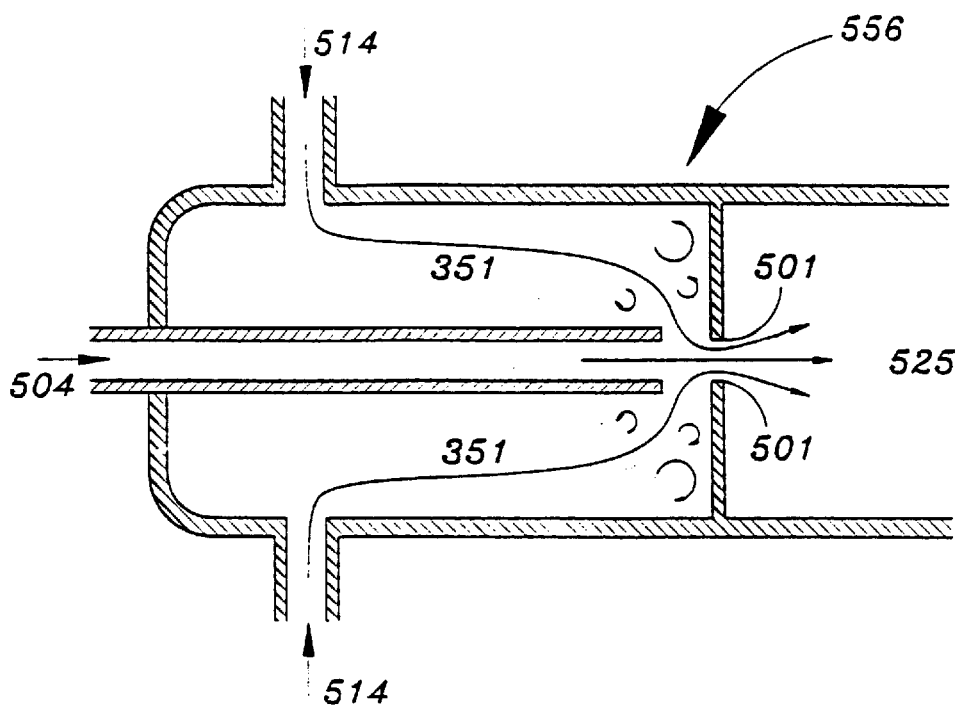
FIG. 5 depicts a pressure reduction system with a tube and shell arrangement.

FIG. 5 depicts a static restriction device 556. Fluid in the first conduit (here shown as conduit 504) may flow in a substantially centrally disposed portion of the second conduit (here shown as conduit 514). The fluid in the second conduit may flow in a substantially annular portion which substantially surrounds the centrally disposed portion. As described in conjunction with FIG. 3, fluid flowing via conduits 514 may comprise cleaner and/or lower temperature fluids, and these fluid tend to flow in streams 551. These streams tend to contact the edge 501 of the restriction device 556 without first mixing with the fluid flowing through conduit 504. The fluid flowing in streams 551 tend to act as a barrier to inhibit at least a portion of the fluid flowing through conduit 504 from contacting the edge of the static restriction device 501. In the manner, corrosion and/or erosion of the static restriction device 556 tends to be reduced.

It has been found that erosion and/or corrosion of the static restriction device tends to be particularly harsh in environments whereby the fluid flowing through the static restriction device contains about 50 parts per million (ppm) or more of entrained solids or particles. Therefore, the systems and methods of the invention tend to be particularly useful to reduce pressures in such streams.

Referring to FIG. 1, it has been found that preferably the static restriction device 16 is sized to provide a selected pressure reduction for a known fluid flow rate. Preferably the known fluid flow rate is greater than the fluid flowing through conduit 4. As such, to provide the selected pressure reduction, at least some fluid must be flowing via conduit 14 and/or 22 and mixing with the fluid flowing through conduit 4. In the manner, control of the system pressure is facilitated via the aforementioned control system using pressure sensor 6, controller 8, etc.

In some systems, pressure reduction through the pressure reduction device 16 tends to cause cavitation. In such systems, the fluid flowing through the static restriction device 16 includes a mixture of gas and liquid. Reducing fluid pressures in such systems tends to be particularly difficult because of the highly erosive velocities resulting when gas/liquid mixtures have their pressure reduced. Therefore, it has been found that the systems and methods of the invention tend to be particularly useful to reduce the pressure of streams including mixtures of gases and liquids.

In the preferred embodiment, the static restriction device comprises a capillary tube/conduit and/or a reduced diameter pipe/conduit. These static restriction devices may have circular, orthogonal (e.g., square or rectangular), oval, or irregular cross-sections. These static restriction devices tend to survive longer in harsh pressure reduction environments since erosion and/or corrosion tends to be distributed along the length of the capillary tube and/or reduced diameter pipe. In a preferred embodiment, the average diameter of the capillary tube/conduit is less than 0.5–0.75 of an inch (and, more preferably, is about one-eighth or about one-sixteenth of an inch) and the fluid flowing in the first conduit 4 includes at least about 50 ppm (and in some embodiments at least about 100, 500, or 1000 ppm) of entrained solids.

It has been found that the systems and methods of the invention tend to be particularly applicable to reduce the pressure of relatively low flow rate systems. As previously mentioned, achieving such pressure reduction may be particularly difficult with static restriction devices since plugging or clogging of the restriction device may result. Therefore, in one embodiment the system is adapted to reduce the pressure when the rate of fluid flowing through the first conduit 4 is less than about 7–10 gpm, and, alternately, less than about 0.25–0.50 gpm during use (e.g., for laboratory systems, which tend to have severe plugging and/or erosion problems when reducing the pressure of relatively high fluid streams containing solids).

Figure 6:
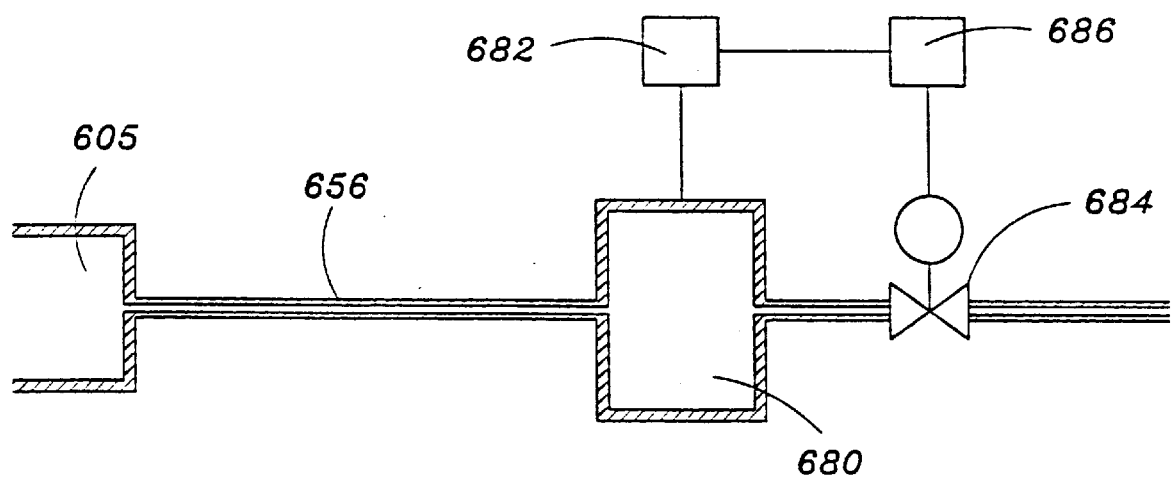
FIG. 6 depicts a pressure reduction system with a reduced diameter pipe.

FIG. 6 depicts a capillary tube/conduit or reduced diameter pipe/conduit 656 which may be used as a static restriction device. Fluid flowing through conduit 605 may flow into the static restriction device 656, thereby resulting in a pressure drop in such fluid.

In alternate embodiments, an accumulator 680 may be located downstream of the static restriction device 656. A pressure sensor 682 may be located on or downstream of the accumulator 680, and a pressure restriction device 684 may be located downstream of the accumulator 680. The pressure restriction device 684 may be a static or dynamic restriction device, and it may be adapted to vary the amount of fluid passed therethrough as a function of the pressure sensed by the pressure sensor 682 located on or downstream of the accumulator 680. A controller 686 may be used in conjunction with the pressure sensor 682 and the pressure restriction device 684.

Preferably, in systems that include at least about 50 ppm of solids in the first fluid stream, the automatic fluid introduction system of the invention is adapted to introduce sufficient fluid via conduit 14 or conduit 22 to prevent clogging of the static restriction device during use. In such systems, controller 8 is adapted to insure that a minimum amount of fluid flows through either conduit 14 or conduit 22.

In some systems, pressure reductions of at least about 1000, 2000, 3000, or 4000 psi are desired. In such systems, erosion and/or corrosion may be mitigated, but rarely is it completely avoided. Therefore, in an alternate embodiment of the invention, the system may be adapted to increase the flow of fluid via conduit 14 and/or 22 as the static restriction device 16 is eroded or corroded. In this manner, the system may continue to operate and maintain a selected pressure sensed by pressure sensor 6.

Maintenance of a selected pressure in the first conduit may be particularly important when a SCWO reactor is maintained upstream of the first conduit. Maintaining a selected pressure helps to insure a steady flowrate through the reactor, and a steady residence time of the fluid within the reactor. In supercritical waste oxidation systems maintenance of the proper residence time is often important to maintain a selected level of oxidation in the reactor. Stable pressure control facilitates more stable reactor temperature, reaction rate, and oxidant injection flow rates. Stable temperature, reaction rate, and oxidant injection rate profiles can be critical to operation of a SCWO unit, and tend to be difficult to maintain without stable pressure control.

The methods and systems of the invention may be particularly applicable for pressure reduction of fluid streams containing sludge or slurries, for instance refinery streams, papermill waste streams, or other streams containing inorganic inert solids.

Experiments

In the first experiment, a Badger Research control valve with stainless steel trim was used to reduce the pressure from about 3200 psig to about atmospheric pressure. An ambient temperature (e.g., about 70 deg. F.) aqueous solution containing approximately 100 ppm alumina particles (5 micron average size) was used as the process fluid. This pressure control valve lasted less than one quarter of one hour. Upon inspection, severe "wire drawing" (i.e., sharp edged groove) erosion was evident on the valve trim.

In a second experiment, a capillary tube of one-eighth inch outside diameter was inserted as a static pressure restriction device in a stream at 4000 psia and about 70 deg. F. The tube had a 0.035 inch wall thickness and was made of 316 stainless steel. A twenty foot length was installed. The flow rate was about 0.5 gallons per minute of a 5 percent aqueous solution of 5 micron alumina particles. The solution was considered to be significantly more abrasive than the low solids concentration used in the first experiment. A Fisher Porter distributed control system was used as controller 8 in FIG. 1. The pressure transducer 6 in FIG. 1 was a Dynisco Model PT 140-5M, available from Dynisco (Norwood, Conn., USA). As shown in FIG. 1, a makeup pump 12 was connected to conduit 14, with ambient temperature water being used as the fluid flowing through the pump 12. The pump was a Haskell Model DF-72, available from Haskell, Inc. (Burbank, Calif., USA). The controller 8 was adapted to vary the speed of the Haskell pump as a function of the pressure sensed. As the sensed pressure went down, the Haskell pump speed was increased. This system operated for at least about five hours without significant erosion or corrosion within the restriction device. Moreover, pressure in conduit 4 was maintained at 4000 psia. In fact, pressure control in the system was more stable than that experienced with a less abrasive stream using a standard pressure reduction control valve.

In a third experiment, municipal sewage was processed in a SCWO reactor at a flowrate of 0.5 gpm. In the system, the pressure of the reactor was about 4000 psi and the temperature of the reactor was in excess of 710 deg. F. A fluid stream comprising water, $CO_2$, oxygen, and more than 50 ppm of entrained solids emerged from the reactor during use. The effluent was cooled to about 70 deg. F. and depressurized using the system described in the second experiment. This system successfully lowered system pressure to atmospheric for the duration of the treatment without significant evidence of wear. It is believed that clay and dirt particles present in the effluent would have eroded a conventional valve trim such as used in the first experiment within minutes. Prior to the implementation of this pressure letdown system, processing of municipal sewage in SCWO reactors had not been possible as a result of inadequate or erratic pressure control.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein or in the steps or in the sequence of steps of the methods described herein without departing from the spirit and scope of the invention as described in the following claims.

What is claimed is:

1. A method of reducing pressure of a fluid by at least 500 p.s.i.g. by passing the fluid through a static restriction device, comprising:

flowing a first fluid stream at a pressure of at least about 500 p.s.i.g.;

sensing the pressure of the first fluid stream with a pressure sensor;

pumping a second fluid stream into the first fluid stream at a location upstream of an inlet of the static restriction device and downstream of the pressure sensor;

reducing the pressure of the mixed fluid stream by at least about 500 p.s.i. by flowing the mixed fluid stream through the static restriction device; and varying an amount of the second fluid being pumped into the first fluid stream as a function of the sensed pressure.

2. The method of claim 1 wherein the first fluid stream is at least about the vicinity of supercritical conditions for water.

3. The method of claim 1 wherein the first fluid stream is at least about supercritical conditions for water.

4. The method of claim 1, further comprising cooling the first fluid stream.

5. The method of claim 1 wherein the static restriction device comprises an edge connected to contact fluid during use, and further comprising flowing at least a portion of the second fluid stream such that it contacts the edge of the static restriction device without first mixing with the first fluid stream.

6. The method of claim 1 wherein at least a portion of the second fluid stream acts as a barrier to inhibit the first fluid stream from degrading the static restriction device during use.

7. The method of claim 6, further comprising flowing the first fluid stream through a substantially centrally disposed portion, and flowing the second fluid stream through an annular portion substantially surrounding the centrally disposed portion.

8. The method of claim 1 wherein the mixed fluid flowing through the static restriction device contains at least about 50 ppm of entrained solids, and wherein the mixed fluid flows through the static restriction device without substantially eroding it.

9. The method of claim 1, wherein the static restriction device is sized to provide a selected pressure reduction for a known fluid flowrate, and wherein this known fluid flowrate is greater than the flowrate of the first fluid stream.

10. The method of claim 1 wherein the mixed fluid stream flowing within the static restriction device comprises a mixture of gas and liquid.

11. The method of claim 1, further comprising monitoring the sensed pressure and varying the amount of the second fluid pumped with an automatic fluid introduction system.

12. The method of claim 1, further comprising varying pump speed as a function of the sensed pressure.

13. The method of claim 1 wherein the second fluid stream comprises water at ambient temperature.

14. The method of claim 1 wherein the static restriction device comprises a capillary tube.

15. The method of claim 14 wherein the average diameter of the capillary tube is less than about ¾ inch, and the first fluid stream comprises at least about 50 ppm of entrained solids and is flowing at a rate of less than about 7 gallons per minute.

16. The method of claim 1 wherein the rate of flow of the first fluid stream is less than about 7 gallons per minute.

17. The method of claim 1 wherein the static restriction device comprises an orifice.

18. The method of claim 1, further comprising adding at least a portion of the fluid stream flowing from the static restriction device to the second fluid stream.

19. The method of claim 1 wherein the second fluid stream comprises fluid at least about supercritical conditions for water.

20. The method of claim 1, further comprising flowing the fluid from the static restriction device through an accumulator, a pressure sensor being located on or downstream of the accumulator, and flowing the fluid from the accumulator through a pressure restriction device, and further comprising varying the amount of fluid passing through the pressure restriction device as a function of the pressure sensed by the pressure sensor located on or downstream of the accumulator.

21. The method of claim 1 wherein the first fluid stream contains at least about 50 ppm of solids, and further comprising adding sufficient second fluid stream to prevent clogging of the static restriction device.

22. The method of claim 1, further comprising compensating for degradation of the static restriction device by increasing the flow of the second fluid stream.

23. The method of claim 1, further comprising increasing the flow of the second fluid stream as the sensed pressure sensed is reduced, and vice versa.

24. The method of claim 1 wherein the first fluid stream flows through a substantially centrally disposed portion of a conduit during use, and wherein the second fluid stream flows through an annular portion substantially surrounding the substantially centrally disposed portion during use.

25. The method of claim 1 wherein the second fluid stream flows through a substantially centrally disposed portion of a conduit during use, and wherein the first fluid stream flows through an annular portion substantially surrounding the substantially centrally disposed portion during use.

26. A method of reducing pressure of a fluid by at least 500 p.s.i.g. by passing the fluid through a static restriction device, comprising:

flowing a first fluid stream at a pressure of at least about 500 p.s.i.g.;

sensing the pressure of the first fluid stream;

mixing a second fluid stream with the first fluid stream upstream of an inlet of the static restriction device and downstream of a location where the pressure of the first fluid stream is sensed;

reducing the pressure of the mixed fluid stream by at least about 500 p.s.i. by flowing the mixed fluid stream through the static restriction device; and varying an amount of the second fluid being mixed with the second fluid stream as a function of the sensed pressure.

27. The method of claim 26 wherein the first fluid stream flows through a substantially centrally disposed portion of a conduit during use, and wherein the second fluid stream flows through an annular portion substantially surrounding the substantially centrally disposed portion during use.

28. The method of claim 26 wherein the second fluid stream flows through a substantially centrally disposed portion of a conduit during use, and wherein the first fluid stream flows through an annular portion substantially surrounding the substantially centrally disposed portion during use.

29. A method of reducing pressure of a fluid by at least 500 p.s.i.g. by passing the fluid through a static restriction device, comprising:

flowing a first fluid stream at a pressure of at least about 500 p.s.i.g.;

sensing the pressure of the first fluid stream;

mixing a second fluid stream with the first fluid stream to form a mixed fluid stream, the second fluid stream being introduced into the first fluid stream at a location upstream of the static restriction device and downstream of a location where the pressure of the first fluid stream is sensed, and wherein at least a portion of the second fluid stream is passed against an edge of the static restriction device during use, thereby acting as a barrier to inhibit at least a portion of the first fluid stream from contacting the static device during use;

reducing the pressure of the mixed fluid stream by at least about 500 p.s.i. by flowing the mixed fluid stream through the static restriction device; and varying an amount of the second fluid stream mixed with the first fluid stream as a function of the sensed pressure.

30. The method of claim 23 wherein the first fluid stream flows through a substantially centrally disposed portion of a conduit during use, and wherein the second fluid stream flows through an annular portion substantially surrounding the substantially centrally disposed portion during use.

31. The method of claim 29 wherein the second fluid stream flows through a substantially centrally disposed portion of a conduit during use, and wherein the first fluid stream flows through an annular portion substantially surrounding the substantially centrally disposed portion during use.

* * * * *